US011299960B2

(12) United States Patent
Zachariah et al.

(10) Patent No.: US 11,299,960 B2
(45) Date of Patent: Apr. 12, 2022

(54) USE OF A BALL CHECK VALVE ON AN OUTLET OF AN AUTONOMOUS INFLOW CONTROL DEVICE

(71) Applicant: Halliburton Energy Services, Inc., Houston, TX (US)

(72) Inventors: Jacob Zachariah, Singapore (SG); Ping Chew Chay, Al Khobar (SA); Stephen Michael Greci, Little Elm, TX (US)

(73) Assignee: Halliburton Energy Services, Inc., Houston, TX (US)

(*) Notice: Subject to any disclaimer, the term of this patent is extended or adjusted under 35 U.S.C. 154(b) by 126 days.

(21) Appl. No.: 16/488,431

(22) PCT Filed: Sep. 4, 2018

(86) PCT No.: PCT/US2018/049404
§ 371 (c)(1),
(2) Date: Aug. 23, 2019

(87) PCT Pub. No.: WO2020/050821
PCT Pub. Date: Mar. 12, 2020

(65) Prior Publication Data
US 2020/0362667 A1 Nov. 19, 2020

(51) Int. Cl.
*E21B 34/06* (2006.01)
*E21B 34/10* (2006.01)
(Continued)

(52) U.S. Cl.
CPC ............ *E21B 34/063* (2013.01); *E21B 34/10* (2013.01); *F16K 15/04* (2013.01); *E21B 43/08* (2013.01);
(Continued)

(58) Field of Classification Search
CPC .... E21B 34/063; E21B 34/10; E21B 2200/08; E21B 2200/04; E21B 43/08; E21B 43/32; E21B 43/12; E21B 34/08; F16K 15/04
See application file for complete search history.

(56) References Cited

U.S. PATENT DOCUMENTS 2,340,481 A * 2/1944 Lloyd .................. E21B 43/122
166/74
6,630,947 B1 * 10/2003 Lieberman ............ E21B 47/002
348/85
(Continued)

FOREIGN PATENT DOCUMENTS

WO 2017053335 3/2017

OTHER PUBLICATIONS

ISRWO International Search Report and Written Opinion for PCT/US2018/049404 dated Jun. 4, 2019.

*Primary Examiner* — Tara Schimpf
*Assistant Examiner* — Jonathan Malikasim
(74) *Attorney, Agent, or Firm* — Scott Richardson; C. Tumey Law Group PLLC (57) ABSTRACT

Provided are systems and methods for controlling the fluid flow to and from the flow ports of an autonomous inflow control device (AICD). Features may include the addition of a ball check valve to the AICD. A well system may comprise: a production tubing; a flow control device, wherein the flow control device is disposed onto the production tubing; and a ball check valve disposed between the flow control device and the production tubing to restrict flow into the production tubing through a port in the flow control device, wherein the ball check valve comprises a housing and a ball.

20 Claims, 4 Drawing Sheets

(51) Int. Cl.
    *F16K 15/04*     (2006.01)
    *E21B 43/08*     (2006.01)
    *E21B 43/32*     (2006.01)

(52) U.S. Cl.
    CPC ........... *E21B 43/32* (2013.01); *E21B 2200/04* (2020.05); *E21B 2200/08* (2020.05)

(56) References Cited

U.S. PATENT DOCUMENTS

| | | |
|---|---|---|
| 8,474,535 B2 | 7/2013 | Richards et al. |
| 8,851,190 B1 | 10/2014 | Lopez |
| 8,985,207 B2 | 3/2015 | Thorkildsen et al. |
| 9,759,035 B2 | 9/2017 | Fripp et al. |
| 9,790,766 B2 | 10/2017 | Huffer et al. |
| 2009/0084556 A1 | 4/2009 | Richards et al. |
| 2011/0303420 A1 | 12/2011 | Thorkildsen et al. |
| 2012/0227839 A1* | 9/2012 | Veit .................. E21B 43/25 137/538 |
| 2014/0034308 A1 | 2/2014 | Holderman et al. |
| 2014/0262207 A1 | 9/2014 | Lopez |
| 2015/0021019 A1* | 1/2015 | Veit .................. E21B 43/12 166/250.15 |
| 2017/0175487 A1* | 6/2017 | Marcin .............. E21B 33/12 |
| 2018/0273440 A1* | 9/2018 | Doud ................ C06B 45/18 |

\* cited by examiner

USE OF A BALL CHECK VALVE ON AN OUTLET OF AN AUTONOMOUS INFLOW CONTROL DEVICE

BACKGROUND

In hydrocarbon production wells, it may be beneficial to regulate the flow of formation fluids from a subterranean formation into a wellbore penetrating the same. A variety of reasons or purposes may necessitate such regulation including, for example, prevention of water and/or gas coning, minimizing water and/or gas production, minimizing sand production, maximizing oil production, balancing production from various subterranean zones, equalizing pressure among various subterranean zones, and/or the like.

A number of devices are available for regulating the flow of formation fluids. Some of these devices may be non-discriminating for different types of formation fluids and may simply function as a "gatekeeper" for regulating access to the interior of a wellbore pipe, such as a well string. Such gatekeeper devices may be simple on/off valves or they may be metered to regulate fluid flow over a continuum of flow rates. Other types of devices for regulating the flow of formation fluids may achieve at least some degree of discrimination between different types of formation fluids. Such devices may include, for example, tubular flow restrictors, nozzle-type flow restrictors, autonomous inflow control devices, non-autonomous inflow control devices, ports, tortuous paths, any combinations thereof, and the like.

Autonomous inflow control devices (AICD) may be particularly advantageous in subterranean operations, since they are able to automatically regulate fluid flow without the need for operator control due to their design. In this regard, AICDs may be designed such that they provide a greater resistance to the flow of undesired fluids (e.g., gas and/or water) than they do desired fluids (e.g., oil), particularly as the percentage of the undesired fluids increases.

Several AICDs may be combined into an AICD system and may be manufactured to particular specifications and/or designs requested by well operators based on production needs for particular well sites. Such design specifications may include the need to seal off the flow ports of an AICD to perform certain downhole operations. The entry and/or exit of fluids into the tooling during certain operations may be harmful to said tooling and/or the operation being performed.

BRIEF DESCRIPTION OF THE DRAWINGS

These drawings represent certain aspects of the present invention and should not be used to limit or define the disclosure.

DETAILED DESCRIPTION

Provided are systems and methods for controlling the fluid flow to and from the flow ports of an autonomous inflow control device (AICD). As discussed below, design features may include the addition of a ball check valve to the AICD. In examples, the ball check valve may be used to create a seal to restrict any fluid flow through the flow ports of the AICD. Further, the ball check valve may comprise a dissolvable ball that may provide a temporary function rather than a permanent one.

Figure 1:
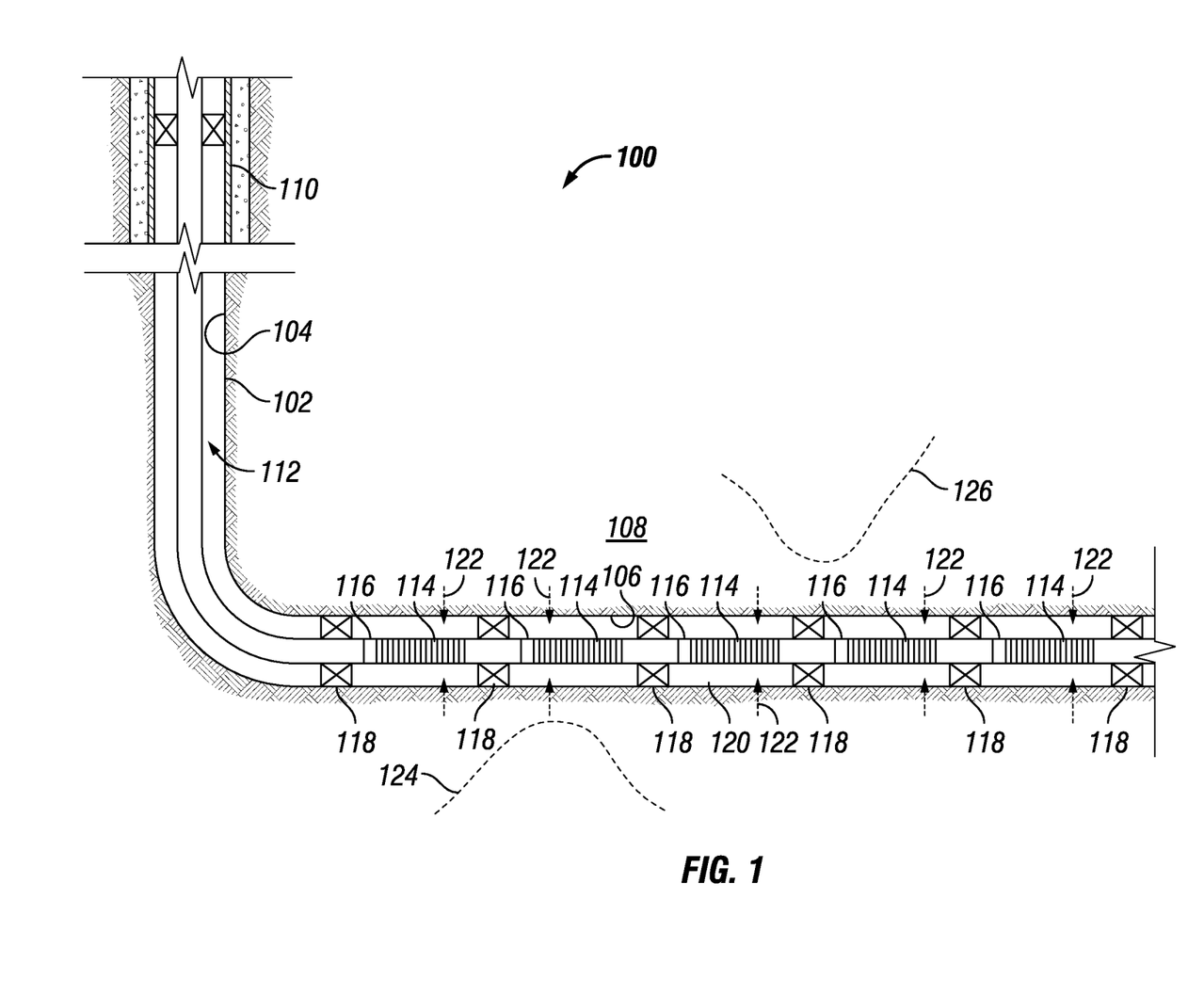
FIG. 1 illustrates an example of a well system.

FIG. 1 illustrates a well system 100 which may embody principles of the present disclosure, according to one or more examples. As illustrated, well system 100 may include a wellbore 102 that comprises a generally vertical uncased section 104 that may transition into a generally horizontal uncased section 106 extending through a subterranean formation 108. In some examples, the vertical section 104 may extend downwardly from a portion of wellbore 102 having a string of casing 110 cemented therein. A tubular string, such as production tubing 112, may be installed in or otherwise extended into wellbore 102.

As depicted, a plurality of well screens 114, flow control devices 116, and packers 118 may be interconnected along production tubing 112, such as along portions of the production tubing 112 in horizontal section 106 of wellbore 102. Packers 118 may be configured to seal off an annulus 120 into different intervals, also identified as zones, defined between production tubing 112 and the walls of wellbore 102. As a result, fluids 122 may be produced from multiple intervals of the surrounding subterranean formation 108 via isolated portions of annulus 120 between adjacent pairs of packers 118.

As illustrated, in some examples, a well screen 114 and a flow control device 116 may be interconnected in production tubing 112 and positioned between a pair of packers 118. Without limitation, well screens 114 may be swell screens, wire wrap screens, mesh screens, sintered screens, expandable screens, pre-packed screens, treating screens, or other known screen types. In operation, well screen 114 may be configured to filter fluids 122, which may be flowing into production tubing 112 from annulus 120. Flow control device 116 may be configured to restrict or otherwise regulate the flow of fluids 122 into production tubing 112, based on certain physical characteristics of fluids 122.

It should be noted that well system 100 may be one example of a wide variety of well systems in which the principles of this disclosure may be utilized. Accordingly, it should be understood that the principles of this disclosure may not be limited to any of the details of the depicted well system 100, or the various components thereof, depicted in the drawings or otherwise described herein. For example, it is not necessary in keeping with the principles of this disclosure for wellbore 102 to include a generally vertical wellbore section 104 or a generally horizontal wellbore section 106. Moreover, it is not necessary for fluids 122 to be only produced from subterranean formation 108 since, in other examples, fluids may be injected into subterranean formation 108, or fluids 122 may be both injected into and produced from subterranean formation 108, without departing from the scope of the disclosure.

Furthermore, it may not be necessary that at least one well screen 114 and flow control device 116 be positioned between a pair of packers 118. Nor may it be necessary for a single flow control device 116 to be used in conjunction with a single well screen 114. Rather, any number, arrangement and/or combination of such components may be used, without departing from the scope of the disclosure. In examples, it may not be necessary for flow control device 116 to be used with a corresponding well screen 114. For example, in injection operations, an injected fluid may flow through flow control device 116, without also flowing through well screen 114.

Advantages of being able to regulate the flow of fluids 122 into production tubing 112 from each zone of subterranean formation 108 may, for example, prevent water coning 124 or gas coning 126 in subterranean formation 108. Other uses for flow regulation in a well may include, but are not limited to, balancing production from (or injection into) multiple zones, minimizing production or injection of undesired fluids, maximizing production or injection of desired fluids, etc.

Figure 2:
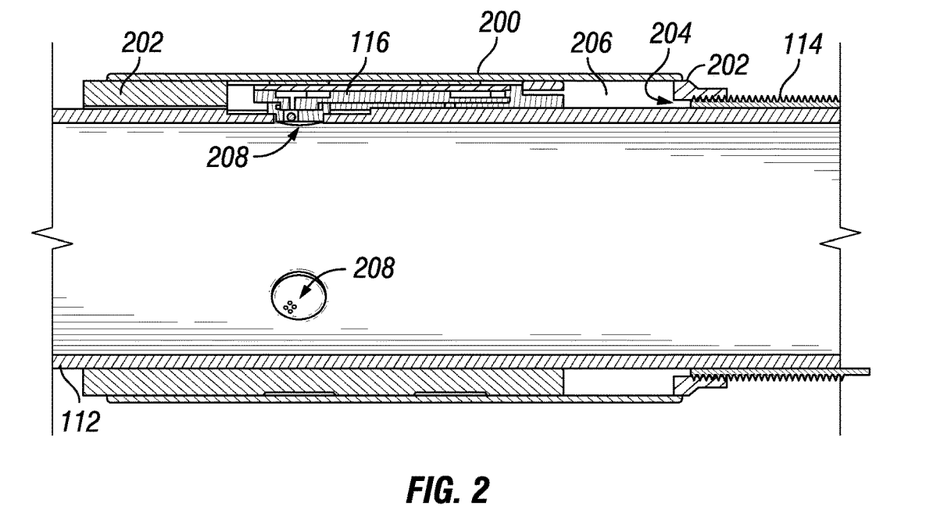
FIG. 2 illustrates a side view of a production string with a ball check valve.
Figure 3:
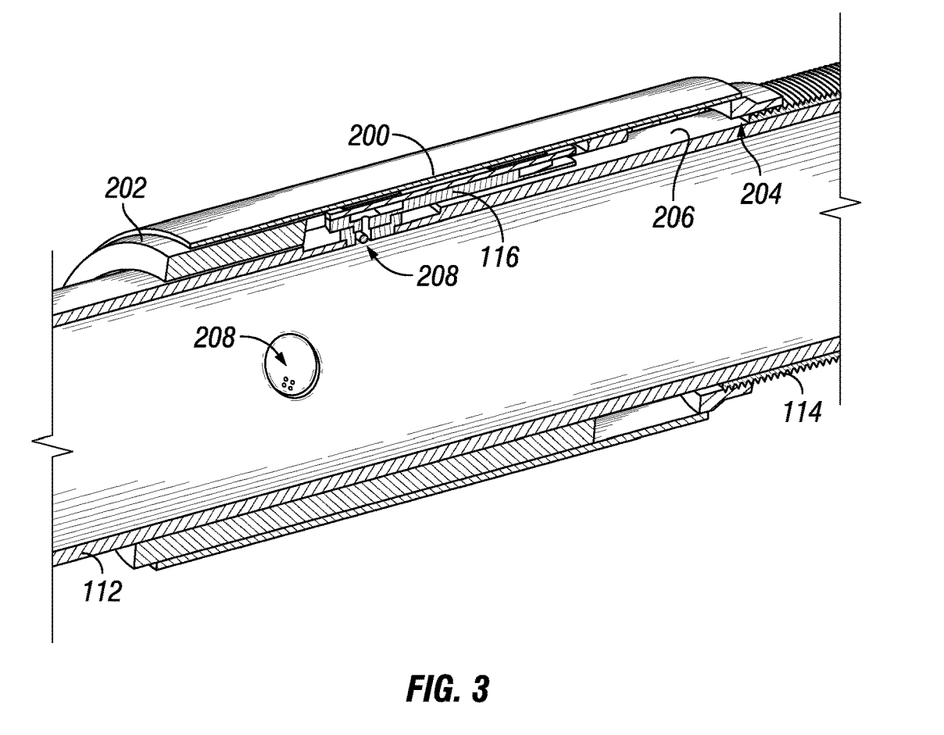
FIG. 3 illustrates a another side view of a production string with a ball check valve.

FIGS. 2 and 3 illustrate an example of a flow control device 116 disposed in production tubing 112, where flow control device 116 may be disposed along a central axis of a length of production tubing 112. It should be noted that in examples, flow control device 116 may be an AICD. During operations, flow control device 116 may utilize fluid dynamics to delay and/or prevent the flow of unwanted fluids such as water and/or gas into an interior of production tubing 112. Flow control device 116 may operate as a passive flow control device, not requiring moving components and/or electronics. Flow control device 116 may be any suitable shape. Without limitation, a suitable shape may include, but is not limited to, cross-sectional shapes that may be circular, elliptical, triangular, rectangular, square, hexagonal, and/or any combinations thereof. Flow control device 116 may be made from any suitable material. Suitable materials may include, but are not limited to, metals, nonmetals, polymers, ceramics, and/or combinations thereof. Without limitation, flow control device 116 may be made from tungsten carbide and/or steel.

In examples, flow control device 116 may be disposed adjacent to well screen 114 and in-line with production tubing 112. Without limitation, flow control device 116 may be fluidly coupled to well screen 114 directly and/or in directly. Additionally, flow control device 116 may be disposed between a sleeve 200 and production tubing 112. Sleeve 200 may act as a fluid barrier and may force fluid to flow through well screen 114 to flow control device 116. Sleeve 200 may connect to production tubing 112 through mounts 202. Mounts 202 may add structure and support to sleeve 200. Additionally, mounts 202 may allow flow control device 116 to be disposed between sleeve 200 and production tubing 112. As illustrated in FIGS. 2 and 3, a gap 204 may disposed between mount 202 and production tubing 112. In examples, well screen 114 may be partially disposed in gap 204. Gap 204 may act as a conduit for fluid to flow from formation 108 (e.g., referring to FIG. 1) through well screen 114 into internal chamber 206. Without limitation, internal chamber 206 may form a flow path, from well screen 114, through gap 204, and to flow control device 116. Internal chamber 206 may comprise any suitable size, height, and/or shape. Internal chamber 206 may act as a reservoir and may further help equalize pressure on both the inside and outside of sleeve 200. Fluids disposed in internal chamber 206 may flow into flow control device 116, which may act as a gateway to the inside of production tubing 112.

As illustrated in FIGS. 2 and 3, flow control device 116 may perforate production tubing 112. In examples, flow control device 116 may be attached to production tubing 112 by any suitable mechanism, including, but not limited to, the use of suitable fasteners, threading, adhesives, thermal fit, press fit, brazing, welding and/or any combination thereof. Without limitation, suitable fasteners may include nuts and bolts, washers, screws, pins, sockets, rods and studs, hinges and/or any combination thereof. Flow control device 116 may at least partially jut into production tubing 112 through a ball check valve 208 disposed between flow control device 116 and production tubing 112. In examples, ball check valve 208 may be a mechanism of flow control device 116 that restricts the flow of fluids 122 (e.g., referring to FIG. 1) from subterranean formation 108 (e.g., referring to FIG. 1) to the interior of production tubing 112 or vice versa.

Figure 4:
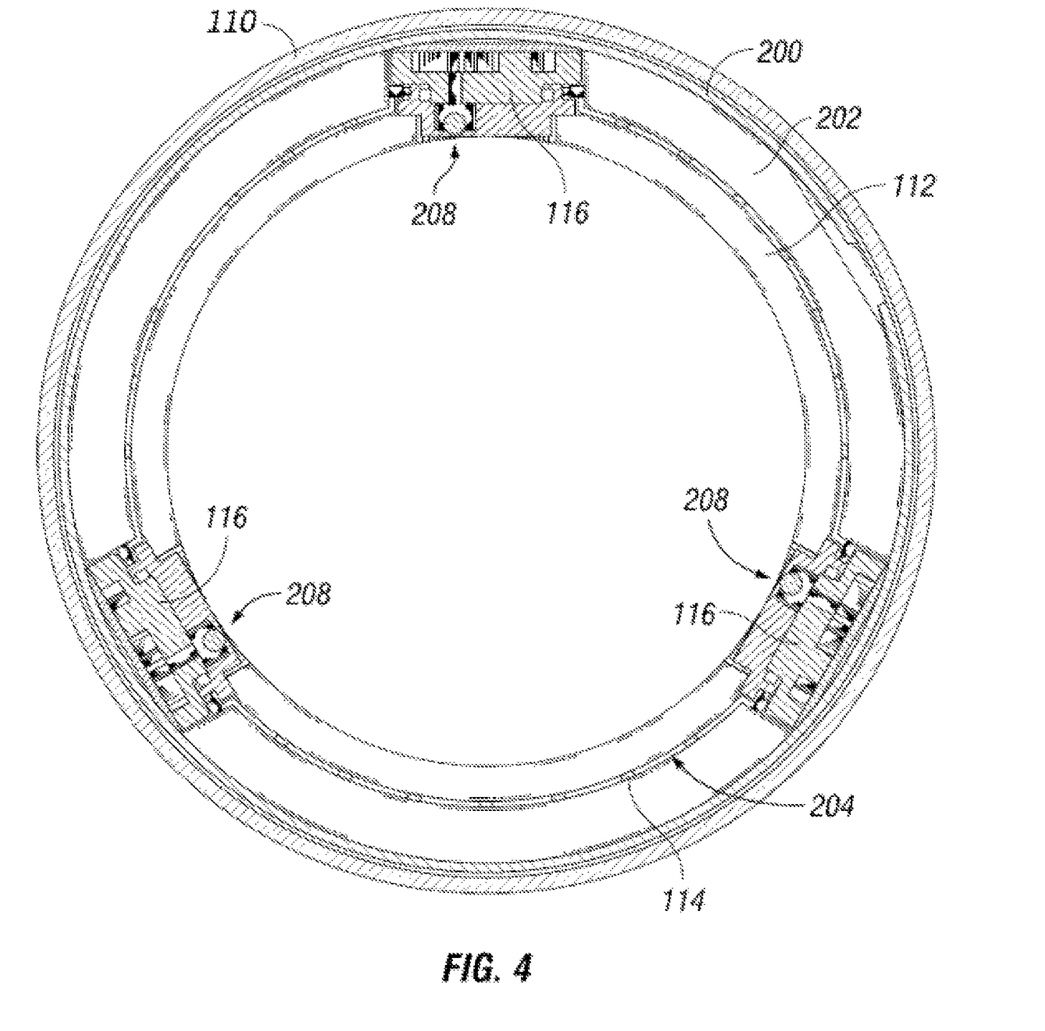
FIG. 4 illustrates a cross-section view of a production string with a ball check valve.

FIG. 4 illustrates a cross-section of production tubing 112 disposed in the casing 110. As illustrated, three flow control devices 116 perforate production tubing 112 with ball check valve 208. Flow control devices 116 are protected by sleeve 200, where sleeve 200 is supported by mounts 202. Additionally, gap 204 may allow for at least a part of well screen 114 to be disposed between sleeve 200 and production tubing 112.

In examples, there may be a plurality of flow control devices 116 disposed about production tubing 112. It should be noted, although not illustrated, there may be any number of suitable ball check valves 208 that may form at least a part of a single flow control device 116. Additionally, there may be any number of flow control devices 116 disposed in production tubing 112 at any suitable location and may be separated by any suitable length along the axis of production tubing 112. As shown, the plurality of flow control devices 116 may be disposed at 120 degree increments within production tubing 112. Without limitations, there may be more or less than three flow control devices 116. The plurality of flow control devices 116 may be disposed at any suitable degree increment within production tubing 112, such as at about 30 degrees, about 60 degrees, about 90 degrees, about 120 degrees, about 150 about, or about 180 degrees from each other. In examples, fluids 122 (e.g., referring to FIG. 1) may travel through well screen 114, through internal chamber 206 (e.g., referring to FIGS. 2 and 3) to flow control device 116. Fluids 122 may pass through flow control device 116 to ball check valve 208, which may act as a gateway between production tubing 112 and flow control device 116. Depending on the direction of the flow of fluids 122, ball check valve 208 may be actuated to seal off access into the interior of production tubing 112.

Figure 5A:
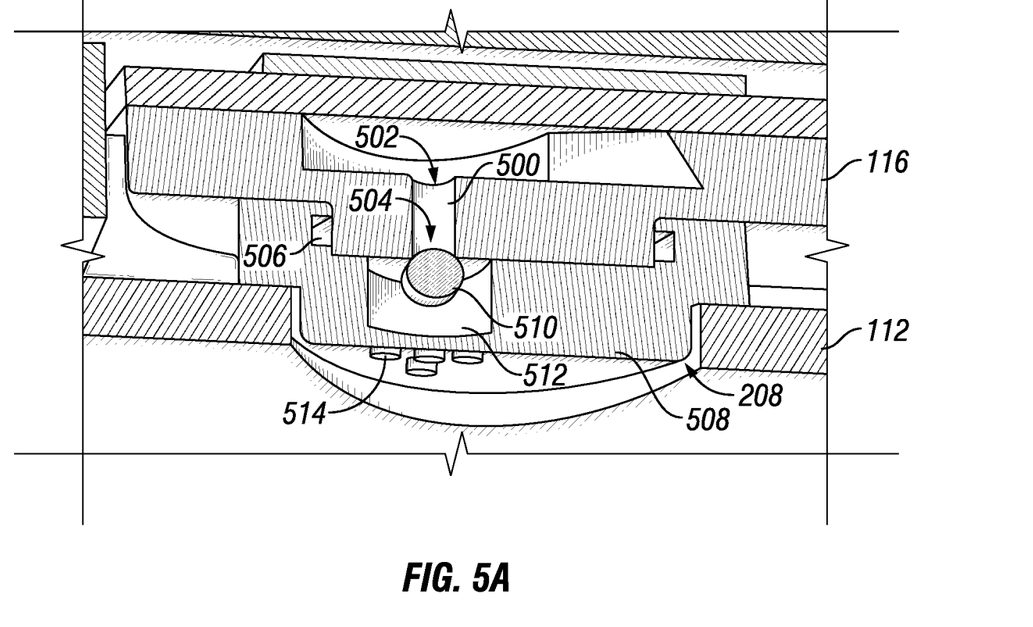
FIGS. 5A and 5B illustrate an example of a ball check valve.
Figure 5B:
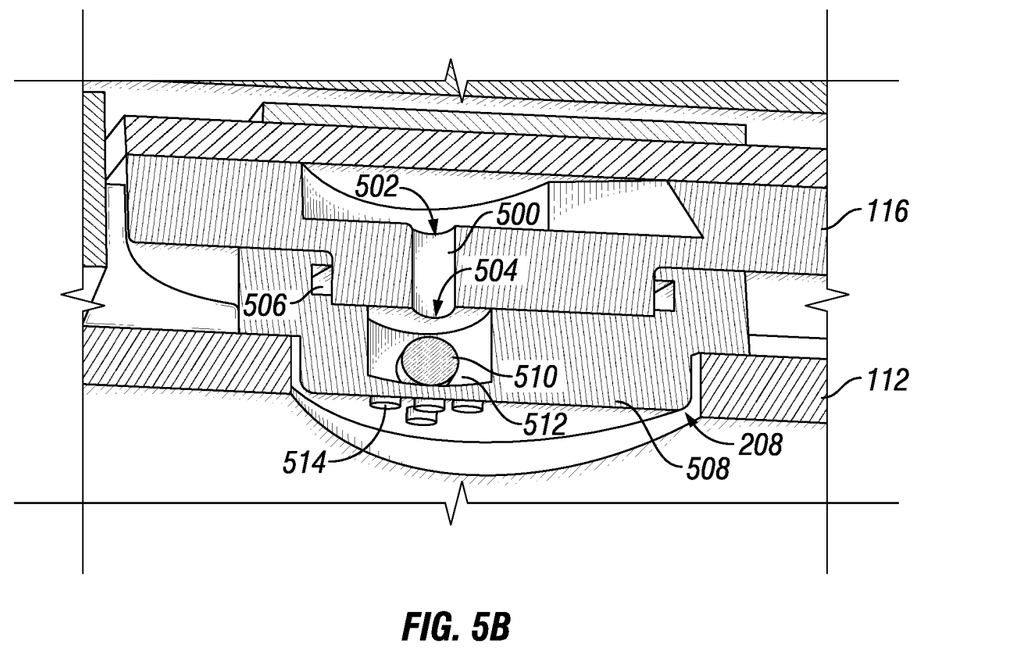

FIGS. 5A and 5B illustrate a close-up and cut away view of ball check valve 208 and flow control device 116. In examples, ball check valve 208 may seat to production tubing 112, which may form a liquid tight seal. In examples, the seal may be created through a press fitting and/or additional material such as rubber. The seal may force fluid 122 to pass through flow control device 116 and further through ball check valve 208.

In examples, flow control device 116 and ball check valve 208 may be fluidly coupled. Fluid 122 (e.g., referring to FIG. 1) may be fluidly couple through flow port 500. Flow port 500 may be a designated pathway that may allow fluid 122 to flow from flow control device 116 to ball check valve 208. Without limitation, flow control device 116 may be tubular, cylindrical, square, round, rectangular, polynomial, and/or any combination thereof. Additionally, flow port 500 may be any suitable size, height, and/or shape. A first end of flow port 500 may be control opening 502 and an opposing end of flow port 500 may be housing opening 504. The defined pathway from control opening 502 through flow port 500 to housing opening 504 may allow fluid 122 to pass from flow control device 116 to ball check valve 208.

To prevent the loss of fluid 122 as fluid 122 flow between flow control device 116 and ball check valve 208 through flow port 500, a seal 506 may be disposed between flow control device 116 and ball check valve 202. In examples, seal 506 may also prevent leakage of fluids 122 as fluids 122 may be injected from the surface. Any suitable type of seal may be used as seal 506 for example an O-ring.

Ball check valve 208 may comprise a housing 508. Housing 508 may form a fluid tight barrier with seal 506 and flow control device 116. Housing 508 may be any suitable shape. Without limitation, a suitable shape may include, but is not limited to, cross-sectional shapes that are circular, elliptical, triangular, rectangular, square, hexagonal, and/or combinations thereof. Housing 508 may be made from any suitable material. Suitable materials may include, but are not limited to, metals, nonmetals, polymers, ceramics, and/or combinations thereof. In examples, housing 508 may jut at least partially into the wall of production tubing 112. Housing 508 may form a structure to support flow control device 116 and may further house ball 510. In examples, a void 512, an absence of material, may be formed in housing 508 where ball 510 may be disposed. Void 512 may be any suitable shape may include, but is not limited to, cross-sectional shapes that are circular, elliptical, triangular, rectangular, square, hexagonal, and/or combinations thereof. Additionally, void 512 may be any suitable size and height to allow ball 510 to operate and function within housing 508 to restrict the movement of fluid 122 (e.g., referring to FIG. 1) through housing 508 and flow control device 116.

In examples, void 512 may be fluidly connected to housing opening 504. Additionally, void 512 may be fluidly coupled to the inside of producing tubing 112 through outlet 514. Outlet 514 may be disposed in housing 508, for example, in the wall of housing 508. Outlet 514 may be any suitable shape may include, but is not limited to, cross-sectional shapes that are circular, elliptical, triangular, rectangular, square, hexagonal, and/or combinations thereof. Additionally, outlet 514 may be any suitable size and height to allow for fluid to pass from void 512 to the inside of production tubing 112. Without limitation, there may be any number of outlets 514. Outlets 514 may be disposed at any suitable location on housing 508. Housing opening 504, void 512, and outlets 514 may allow flow control device 116 to be fluidly coupled to production tubing 112. The flow of fluid (e.g., referring to FIG. 1) from flow control device 116 to production tubing 112 may be restricted and/or stopped by ball 510.

Without limitation, ball 510 may seat to housing opening 504. In examples, when ball 510 is seated to housing opening 504, flow of fluid may be halted. In examples, the flow of fluid from formation 108 (e.g., referring to FIG. 1) to production tubing 112 may prevent ball 510 from seating to housing opening 5042, which may allow for the unobstructed flow of fluids. In examples, fluid may flow through the center of production tubing 112, which may exert a force on ball 510 to seat ball 510 to housing opening 504. This may prevent the flow of fluids from the inside of production tubing 112 to formation 108. It should be noted that flow control device 116 may be manufactured to where the flow of fluid from formation 108 to production tubing 112 may seat ball 510 and halt flow. Flow control device 116 may further be manufactured to allow the flow of fluid from inside production tubing 112 to migrate to formation 108.

Ball 510 may be any suitable shape. Without limitation, a suitable shape may include, but is not limited to, cross-sectional shapes that are circular, elliptical, triangular, rectangular, square, hexagonal, and/or combinations thereof. Ball 510 may be made from any suitable material. Suitable materials may include, but are not limited to, metals, nonmetals, polymers, ceramics, glassy materials, and/or combinations thereof. In examples, ball 510 may be made of polyurethane (PU), natural rubber, rubber modified polymers, high impact polystyrene (HIPS), acrylic rubber, and/or combinations thereof. In examples, ball 510 may be made of a suitable aliphatic polyester material. Without limitations, a suitable aliphatic polyester may be polylactic acid (PLA), polyglycolide (PGA), poly(lactide-co-glycolide) (PLGA), poly(caprolactone) (PCL), polyhydroxyalkanoate (PHA), and/or combinations thereof. In examples, ball 510 may be manufactured from a dissolvable material. Any suitable dissolvable material may be used. Without limitations, ball 510 may be made from an aluminum alloy, a magnesium alloy, and/or a calcium alloy. Ball 510 may be doped with materials such as iron, copper, nickel, tin, tungsten, carbon, and/or combinations thereof to increase the desired standard state reduction potential, wherein the standard state reduction potential affects the reaction rate of ball 510 in a dissolution fluid.

During production operations, as an injection fluid is supplied to production tubing 112, the injection fluid may enter into ball check valve 208 through outlet 514. The flow of injection fluids may force ball 510 against housing opening 504, thereby restricting the flow of injection fluid from the inside of production tubing 112 to formation 108. During continued production operations, fluid 122 (e.g., referring to FIG. 1) may flow from formation 108 to wellbore 102 (e.g., referring to FIG. 1). In examples, fluid 122 may traverse through well screen 114 (e.g., referring to FIG. 1) into flow control device 116, and then into ball check valve 208. In examples, the pressure supplied by fluids 122 may push ball 510 away from housing opening 504, thereby allowing fluids 122 to flow through ball check valve 208 and into production tubing 112.

In alternate examples wherein ball 510 may be made of a dissolvable material, the restriction of fluid flow may be temporary. An operator may introduce a dissolution fluid into production tubing 112 that may enter into ball check valve 208. In examples, an operator may be defined as an individual, group of individuals, or an organization. Without limitations, the dissolution fluid may comprise any suitable electrolyte. In examples, the dissolution fluid may be a brine, water, oil, acid, and/or combinations thereof. As the dissolution fluid comes into contact with ball 510, galvanic corrosion may occur. In examples, the integrity of ball 510 may degrade, and ball 510 may dissolve. In examples, ball 510 may dissolve at any suitable rate. Without limitations, a suitable rate may be from about a minute, about a day, about a week, or about a month.

In examples, ball 510 may be replaceable on-site at wellbore 102 (e.g., referring to FIG. 1). A non-dissolvable ball 510 may be replaced by a dissolvable ball 510 and vice versa. Suitable applications of ball check valve 208 may include setting a packer and/or other sealing element downhole, pressurizing production tubing 112, implementing a wash-pipe free operation, and/or combinations thereof. In examples, well screen 114 (e.g., referring to FIG. 1) may be run downhole with wash-pipe. Injection fluids may be pumped to displace the wash-pipe to attempt to dispose well screen 114 at a suitable depth. The injection fluids may be forced out of well screen 114 through screen joints, thereby clearing a path for well screen for operations.

The systems, methods, and apparatus, as described in the present disclosure, may further be characterized by one or more of the following statements.

Statement 1. A well system comprising: a production tubing; a flow control device, wherein the flow control device is disposed onto the production tubing; and a ball check valve disposed between the flow control device and the production tubing to restrict flow into the production tubing through a port in the flow control device, wherein the ball check valve comprises a housing and a ball.

Statement 2. The well system of statement 1, wherein the ball creates a seal against the flow control device.

Statement 3. The well system of statement 1 or 2, wherein the housing comprises an inlet, an outlet, and a check valve internal chamber.

Statement 4. The well system of statement 3, wherein the ball is disposed within the check valve internal chamber.

Statement 5. The well system of statement 3, wherein the inlet is disposed along a wall of the check valve internal chamber, wherein the outlet is disposed along an opposing wall of the check valve internal chamber from the inlet.

Statement 6. The well system of any of the previous statements, wherein the ball comprises a dissolvable material.

Statement 7. The well system of statement 6, wherein the dissolvable material comprises at least one material selected from the group consisting of an aluminum alloy, a magnesium alloy, a calcium alloy, and an aliphatic polyester material.

Statement 8. The well system of statement 7, wherein the ball further comprises at least one additional material selected from the group consisting of iron, copper, nickel, tin, tungsten, and carbon to increase a standard state reduction potential of the ball.

Statement 9. The well system of any of the previous statements, wherein the flow control device is an autonomous inflow control device.

Statement 10. A method of controlling flow of fluids, comprising: injecting a fluid into a production tubing, wherein a flow control device is disposed on the production tubing, wherein a ball check valve is disposed between the flow control device and the production tubing to restrict flow into the production tubing through a port in the flow control device; and actuating the ball check valve.

Statement 11. The method of statement 10, wherein the ball check valve comprises a housing and a ball.

Statement 12. The method of statement 11, wherein the actuating the ball check valve comprises displacing the ball within the housing.

Statement 13. The method of statement 12, wherein the displacing the ball comprises creating a seal that restricts the fluid from flowing through the ball check valve to the flow control device.

Statement 14. The method of statement 13, further comprising breaking the seal when a second fluid flows from a subterranean formation to the flow control device and into the ball check valve.

Statement 15. The method of any of statements 11 to 14, wherein the ball comprises at least one material selected from the group consisting of polyurethane, natural rubber, rubber modified polymers, high impact polystyrene, and acrylic rubber.

Statement 16. A method of controlling flow of fluids, comprising: injecting a first fluid into a production tubing, wherein a flow control device is disposed on the production tubing, wherein a ball check valve is disposed between the flow control device and the production tubing, wherein the ball check valve comprises a housing and a dissolvable ball; and actuating the ball check valve, wherein the actuating the ball check valve comprises displacing the dissolvable ball within the housing, wherein the displacing the dissolvable ball comprises of creating a seal that restricts the flow of the first fluid from the production tubing to the flow control device.

Statement 17. The method of statement 16, further comprising of injecting a dissolution fluid into the production tubing to contact the dissolvable ball, wherein the dissolution fluid comprises an electrolyte.

Statement 18. The method of statement 17, wherein the dissolvable ball dissolves due to galvanic corrosion in response to contact with the dissolution fluid, wherein the seal breaks.

Statement 19. The method of statement 17, wherein the dissolution fluid is a brine, water, oil, acid, or combination thereof.

Statement 20. The method of any of statements 16 to 19, wherein the dissolvable ball comprises at least one material selected from the group consisting of an aluminum alloy, a magnesium alloy, a calcium alloy, and an aliphatic polyester material.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A well system comprising:
   a production tubing;
   a sleeve;
   a mount disposed between the sleeve and the production tubing;
   a flow control device, wherein the flow control device is disposed between the production tubing and the sleeve;
   a ball check valve disposed between the flow control device and the production tubing to restrict flow into the production tubing through a port in the flow control device, wherein the ball check valve comprises a housing and a ball, wherein a portion of the flow control device is disposed within the housing of the ball check valve; and
   a conduit disposed between the sleeve and the production tubing, the conduit in fluid communication with a second flow control device.

2. The well system of claim 1, wherein the conduit extends along a circumference of the production tubing.

3. The well system of claim 1, wherein the housing comprises an inlet, an outlet, and a check valve internal chamber.

4. The well system of claim 3, wherein the ball is disposed within the check valve internal chamber.

5. The well system of claim 1, further comprising a gap disposed between the mount and the production tubing.

6. The well system of claim 1, wherein the ball comprises a dissolvable material.

7. The well system of claim 6, wherein the dissolvable material comprises at least one material selected from the group consisting of an aluminum alloy, a magnesium alloy, a calcium alloy, and an aliphatic polyester material.

8. The well system of claim 7, wherein the ball further comprises at least one additional material selected from the group consisting of iron, copper, nickel, tin, tungsten, and carbon to increase a standard state reduction potential of the ball.

9. The well system of claim 1, wherein the flow control device is an autonomous inflow control device.

10. A method of controlling flow of fluids, comprising:
    injecting a fluid into a production tubing, wherein a flow control device is disposed between a sleeve and the production tubing, wherein a ball check valve is disposed between the flow control device and the production tubing to restrict flow into the production tubing through a port in the flow control device, wherein a mount is disposed between the sleeve and the production tubing;
    actuating the ball check valve, wherein a portion of the flow control device is disposed within a housing of the ball check valve; and
    allowing fluid communication with a second flow control device via a conduit disposed between the sleeve and the production tubing.

11. The method of claim 10, further comprising allowing fluid communication with the second flow control device via the conduit that is disposed along a circumference of the production tubing.

12. The method of claim 11, wherein the actuating the ball check valve comprises displacing a ball within the housing.

13. The method of claim 12, wherein the displacing the ball comprises creating a seal that restricts the fluid from flowing through the ball check valve to the flow control device.

14. The method of claim 13, further comprising breaking the seal when a second fluid flows from a subterranean formation to the flow control device and into the ball check valve.

15. The method of claim 12, wherein the ball comprises at least one material selected from the group consisting of polyurethane, natural rubber, rubber modified polymers, high impact polystyrene, and acrylic rubber.

16. A method of controlling flow of fluids, comprising:
    injecting a first fluid into a production tubing, wherein a flow control device is disposed between a sleeve and the production tubing, wherein a ball check valve is disposed between the flow control device and the production tubing, wherein the ball check valve comprises a housing and a dissolvable ball, wherein a portion of the flow control device is disposed within the housing of the ball check valve, wherein a mount is disposed between the sleeve and the production tubing;
    actuating the ball check valve, wherein the actuating the ball check valve comprises displacing the dissolvable ball within the housing to restrict the flow of the first fluid from the production tubing to the flow control device; and
    allowing fluid communication with a second flow control device via a conduit disposed between the sleeve and the production tubing.

17. The method of claim 16, further comprising of injecting a dissolution fluid into the production tubing to contact the dissolvable ball, wherein the dissolution fluid comprises an electrolyte.

18. The method of claim 17, wherein the dissolvable ball is dissolvable due to galvanic corrosion in response to contact with the dissolution fluid.

19. The method of claim 17, wherein the dissolution fluid is a brine, water, oil, acid, or any combination thereof.

20. The method of claim 16, wherein the dissolvable ball comprises at least one material selected from the group consisting of an aluminum alloy, a magnesium alloy, a calcium alloy, and an aliphatic polyester material.

* * * * *

UNITED STATES PATENT AND TRADEMARK OFFICE
CERTIFICATE OF CORRECTION

| | | |
|---|---|---|
| PATENT NO. | : 11,299,960 B2 | Page 1 of 1 |
| APPLICATION NO. | : 16/488431 | |
| DATED | : April 12, 2022 | |
| INVENTOR(S) | : Zachariah et al. | |

It is certified that error appears in the above-identified patent and that said Letters Patent is hereby corrected as shown below:

In the Specification

Column 5, Line 48 please remove "housing opening 5042" and replace with "housing opening 504".

Signed and Sealed this
Fourteenth Day of June, 2022

Katherine Kelly Vidal
*Director of the United States Patent and Trademark Office*